(12) United States Patent
Choi

(10) Patent No.: US 6,457,830 B1
(45) Date of Patent: Oct. 1, 2002

(54) REFLECTION-TYPE PROJECTOR

(75) Inventor: Soon-cheol Choi, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 47 days.

(21) Appl. No.: 09/704,825

(22) Filed: Nov. 3, 2000

(30) Foreign Application Priority Data

Nov. 4, 1999 (KR) ............................................ 99-48586

(51) Int. Cl.$^7$ .............................................. G03B 21/28
(52) U.S. Cl. ............................. 353/33; 353/84; 353/81; 353/99
(58) Field of Search ............................. 353/33, 81, 99, 353/84, 98; 348/743, 771

(56) References Cited

U.S. PATENT DOCUMENTS

| 5,309,188 A | 5/1994 | Brustyn ........................ 353/33 |
| 5,552,922 A | 9/1996 | Magarill ...................... 359/224 |
| 5,865,520 A | 2/1999 | Kavanagh et al. ............ 353/31 |
| 6,179,424 B1 | * 1/2001 | Sawamura .................... 353/33 |

FOREIGN PATENT DOCUMENTS

| GB | 2 311 447 A | 9/1997 | .......... H03M/13/00 |
| GB | 2 324 166 A | 10/1998 | ........... G02B/27/18 |
| WO | 96/31953 | 10/1996 | .......... H03M/13/00 |

OTHER PUBLICATIONS

C.B. Shung et al. "Area–Efficient Architectures for the Viterbi Algorithm" vol. 3; Dec. 1990; pp. 1787–1793.

* cited by examiner

Primary Examiner—W. B. Perkey
(74) Attorney, Agent, or Firm—Sughrue Mion, PLLC

(57) ABSTRACT

A reflection-type projector includes a light source for generating and emitting light, an optical path changer for changing the traveling path of an incident beam, and an image former. Preferably, the image former is a micromirror device having a plurality of movable mirrors provided to correspond to respective pixels, and windows for enclosing the movable mirrors, where the windows transmit most of the incident rays. The micro-mirror device reflects incident rays to form necessary reflected rays and unnecessary reflected rays having reflection paths that differ according to the driven states of the movable mirrors. The reflection-type projector further includes a projection lens unit for magnifying incident rays and projecting the rays. The optical path changer includes a beam separation prism having a first critical surface that is slanted so that incident rays from the light source pass through the first critical surface, and the necessary reflected rays entering from the image former and surface-reflected rays reflected from the window of the image former are reflected by the first critical surface. The beam separation prism further includes an entrance-exit surface that faces the image former and one surface of the projection lens unit, through which entrance-exit surface rays enter or exit. The beam separation prism also includes a second critical surface that is slanted with respect to the optical axis of necessary reflected rays reflected from the first critical surface, wherein the second critical surface transmits the unnecessary reflected rays and surface-reflected rays reflected from the first critical surface, and wherein the second critical surface reflects the necessary reflected rays reflected from the first critical surface to the projection lens unit.

5 Claims, 5 Drawing Sheets

REFLECTION-TYPE PROJECTOR

BACKGROUND OF THE INVENTION

1. Field of the Invention

The present invention relates to a reflection-type projector, and more particularly, to a reflection-type projector having an improved light separation structure in order to reduce the effect of light reflected from a window surface of an image forming means, such as a micromirror device.

2. Description of the Related Art

In general, in a reflection-type projector employing a micro-mirror device, a plurality of micro-mirrors provided to correspond to pixels of a screen are independently operated, and the paths of rays reflected from the movable mirrors are differentiated by the movable mirrors, so that an image can be formed.

Referring to FIG. 1, a reflection-type projector employing a conventional micromirror device includes a light source 10 emitting light rays, a color wheel 20 for embodying a color image, a glass rod 30 for generating uniform rays, a lens element 40 for converging incident rays, a light path changing means 50 for changing the paths of light rays, a micromirror device 60 for forming an image, and a projection lens unit 70 for projecting incident rays onto a screen to form a magnified image on the screen.

The light path changing means 50 is provided with a beam separation prism 51 which changes the paths of rays by transmitting the incident rays entering the beam separation prism 51 at angles smaller than a critical angle and by reflecting the incident rays entering the beam separation prism 51 at angles greater than a critical angle. A compensating prism 55 is further provided to compensate for deviations of the paths of the separated beams.

The beam separation prism 51 has an incident surface 51a through which the rays emitted from the light source 10 enter, a critical surface 51b slanted with respect to the incident surface 51a, and an entrance-exit surface 51c facing the micro-mirror device 60 and transmitting incident rays reflected from the critical surface 51b and rays reflected from the micro-mirror device 60. The critical surface 51b reflects the incident rays entering the beam separation prism 51 via the incident surface 51a at angles greater than the critical angle toward the entrance-exit surface 51c, and transmits the incident rays from the micro-mirror device 60 at angles smaller than the critical angle. The compensating prism 55 is disposed so that one of its surfaces faces the critical surface 51b of the beam separation prism 51 and compensates for the deviations of the paths of the rays traveling toward the projection lens unit 70.

As shown in FIGS. 2 and 3, the micro-mirror device 60 comprises a plurality of movable mirrors 62 installed on a substrate 61 to correspond to respective pixels, a plurality of posts 63 each for supporting the respective movable mirrors 62 so that the movable mirrors 62 can pivot, and a window 65 for protecting the movable mirrors 62. Each movable mirror 62 is driven to rotate by electrostatic attraction forces between the movable mirror 62 and electrodes provided on the substrate 61.

Therefore, the angles of the reflection surfaces of the movable mirrors 62 are individually selected according to whether the electrodes corresponding to the respective pixels are driven or not, that is, depending on whether the electrodes are in an on-state or in an off-state. Therefore, an image is formed by causing only necessary rays reflected from mirrors 62 in the on-state to be directed to the projection lens unit 70, and by causing unnecessary rays reflected from mirrors 62 in the off-state to travel away from the projection lens unit 70 so as not to be used.

In the micro-mirror device 60, the incident rays are reflected from the surface of the window 65 as well as the movable mirrors 62. The rays reflected from the surface of the window 65 are called surface-reflected rays.

Reviewing FIG. 1, a reflection-type projector employing a conventional micro-mirror device is configured so that both the necessary reflected rays and the surface-reflected rays reflected from the micro-mirror device 60 travel after passing through the critical surface 51b, and a portion of the surface-reflected rays are directed to a screen together with the necessary rays after passing through the projection lens unit 70. Therefore, the reflection-type projector employing a conventional micro-mirror device is problematic, in that the contrast of an image formed on the screen deteriorates noticeably.

SUMMARY OF THE INVENTION

To solve the above problem, it is an objective of the present invention to provide a reflection-type projector that has an improved light separation structure, so that surface-reflected rays reflected from the surface of a window of an image forming means may not be directed to a screen.

Accordingly, to achieve the above objective, there is provided a reflection-type projector including a light source for generating and emitting light; an optical path changer for changing the traveling path of an incident beam; an image former that is provided to correspond to respective pixels for reflecting incident rays to form necessary reflected rays and unnecessary reflected rays having reflection paths different from each other according to the driven states of the image former and which has a window for enclosing the image former; and a projection lens unit for magnifying incident rays and projecting the rays, wherein the optical path changer is a beam separation prism having: a first critical surface that is slanted so that incident rays from the light source pass through the first critical surface, and the necessary reflected rays and surface-reflected rays reflected from the window are reflected by the first critical surface; an entrance-exit surface that faces the image former and one surface of the projection lens unit and through which rays enter or exit; and a second critical surface slanted with respect to the optical axis of necessary reflected rays reflected from the first critical surface in order to transmit unnecessary reflected rays and surfacereflected rays reflected from the first critical surface, and in order to reflect necessary reflected rays reflected from the first critical surface to the projection lens unit

BRIEF DESCRIPTION OF THE DRAWINGS

The above objective and advantage of the present invention will become more apparent by describing in detail preferred embodiments thereof with reference to the attached drawings in which.

DETAILED DESCRIPTION OF THE PREFERRED EMBODIMENTS

Figure 3:
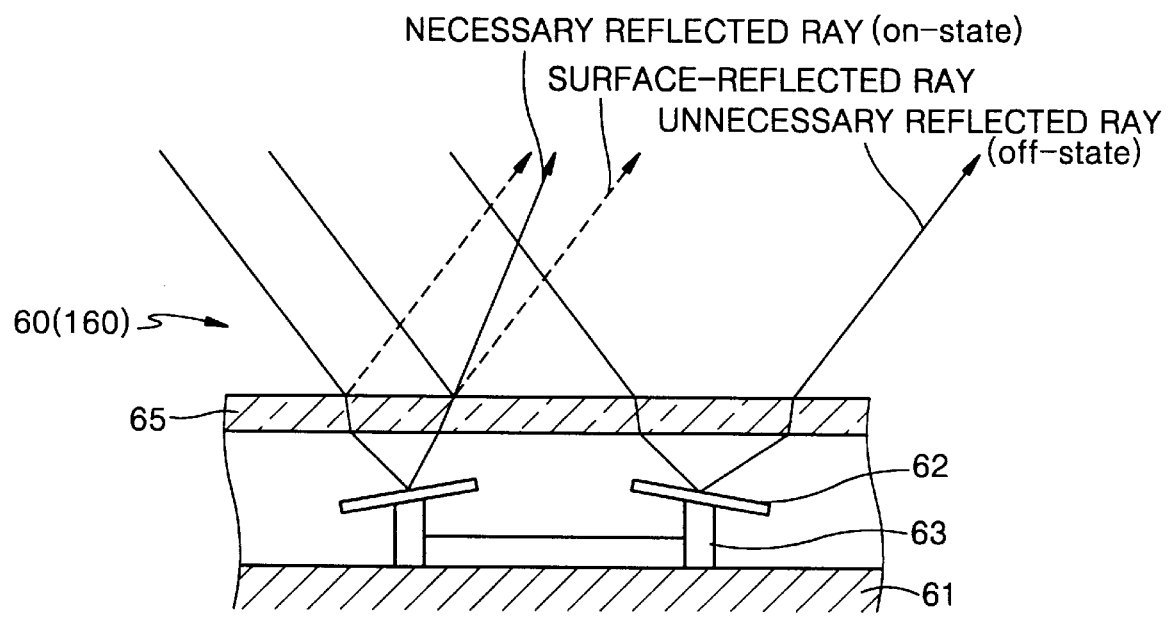
FIG. 3 is a sectional view schematically illustrating a portion of a general micromirror device.
Figure 4:
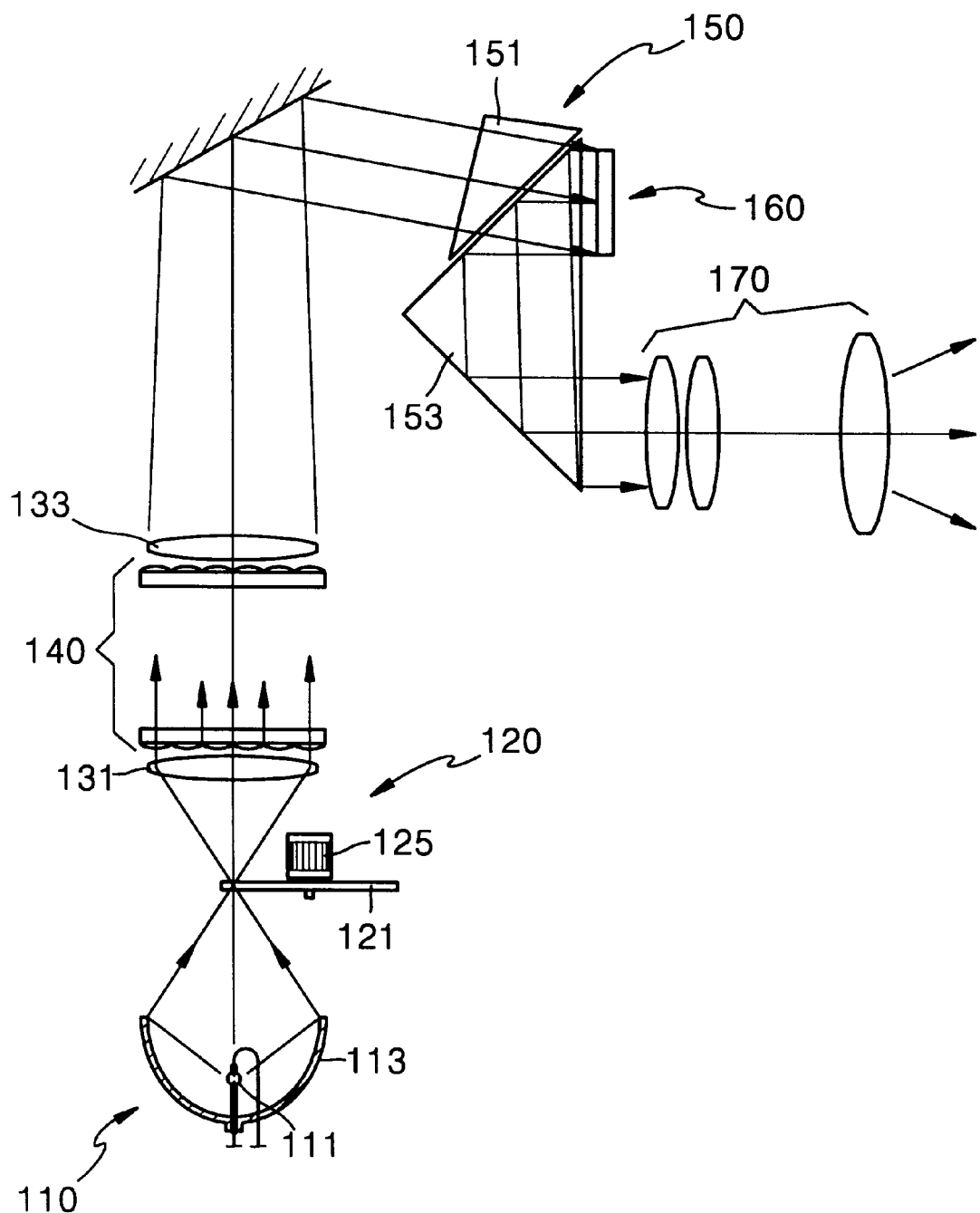
FIG. 4 is a schematic diagram illustrating an optical layout of a reflection-type projector according to an embodiment of the present invention.

Referring to FIG. 4, a reflection-type projector according to the present invention comprises a light source 110 for generating and emitting light rays, an optical path changer 150 for changing the traveling paths of incident rays, an image former 160, and a projection lens unit 170 for magnifying incident rays and projecting the rays onto a screen (not shown). In addition, it is preferable that the reflection-type projector further includes a color selector 120 provided on the optical path between the light source 110 and the optical path changer 150 for forming a color image, a collimating lens 131 for converging the rays having passed through the color selector 120 so as to form a parallel beam, and a uniform light illuminator 140 for making the parallel beam uniform so that the image former can be illuminated uniformly. The image former may be a micro-mirror device comprising a plurality of movable mirrors 62 provided to correspond to respective pixels, and a window 65 for enclosing the movable mirrors 62 and transmitting most of the incident rays, for reflecting incident rays to form necessary reflected rays and unnecessary reflected rays having reflection paths different from each other according to the driven states of the movable mirrors 62. (See FIGS. 2 and 3.)

The light source 110 includes a lamp 111 for generating light rays, and a reflecting mirror 113 for reflecting the rays emitted from the lamp 111 and guiding the rays in their respective paths. Preferably, the reflecting mirror 113 is an ellipsoidal reflector having the lamp 111 at one focal point and a light focusing point at the other focal point.

The color selector 120 is provided in the vicinity of the other focal point, and has a color wheel 121 having filters for selectively transmitting the respective rays of red (R), blue (B), and green (G) color wavelengths, and a driving source 125 for driving the color wheel 121 to rotate so that the filters can be positioned alternately on the optical path. In this way, an image of one frame is produced by overlapping images formed to correspond to the respective colors during one revolution of the color wheel 121.

The collimating lens 131 converges the light converged and diverged by the reflecting mirror 113 in order to form a parallel beam. In addition, the uniform light illuminator 140 is intended to make the rays traveling toward the micro-mirror device uniform, and preferably comprises a pair of fly's eye lens units spaced a predetermined distance from each other. The fly's eye lens units divide the beam entering from the collimating lens 131 into a plurality of beams, and converge and diverge the divided beams, and again converge the beams. In this way, the fly's eye lens units mix the divided beams to form a uniform beam. In addition, the fly's eye lens units change the sectional shape of an incident beam from a circle to a rectangle corresponding to the shape of the micro-mirror device. The parallel beam transmitted through the uniform light illuminator 140 is converged by a converging lens 133 to be appropriate for the size of the micro-mirror device 160.

Figure 5:
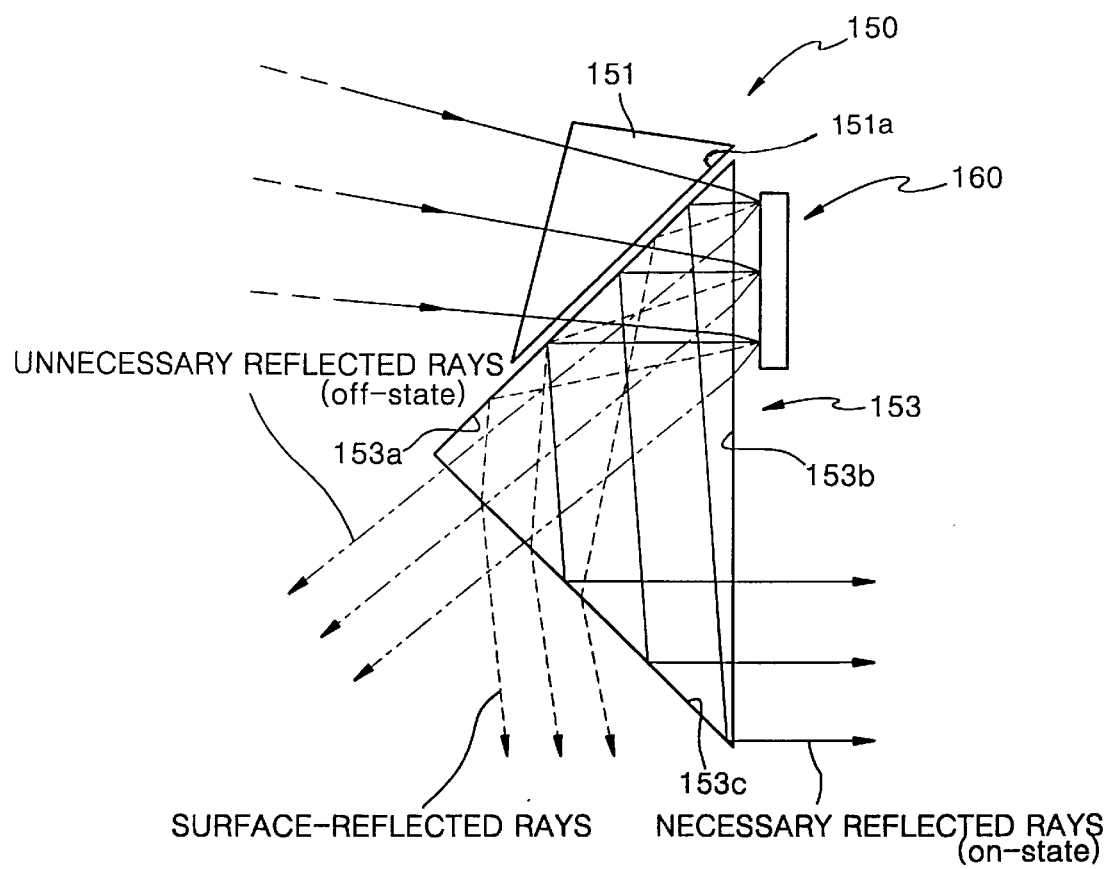
FIG. 5 is a diagram illustrating exemplary traveling paths of rays classified according to the operation of a micro-mirror device and separated in a beam separation prism.

Referring to FIG. 5, the optical path changer 150 includes a beam separation prism 153 having first and second critical surfaces 153a and 153c that reflect rays entering at angles greater than a critical angle, and refract and transmit rays entering at angles smaller than a critical angle, and an entrance-exit surface 153b that transmits incident rays. In addition, it is preferable that the optical path changer 150 further includes a compensating prism 151 having a compensating surface 151a that faces the first critical surface 153a of the beam separation prism 153. The compensating prism 151 compensates for deviations in the rays illuminating the micro-mirror device 160 so as to minimize the deformation of an image within the illumination area.

The first critical surface 153a is slanted with respect to the optical axis of rays entering from the light source 110 in order to transmit the rays entering from the light source 110, and in order to reflect rays from the micro-mirror device 160.

Figure 1:
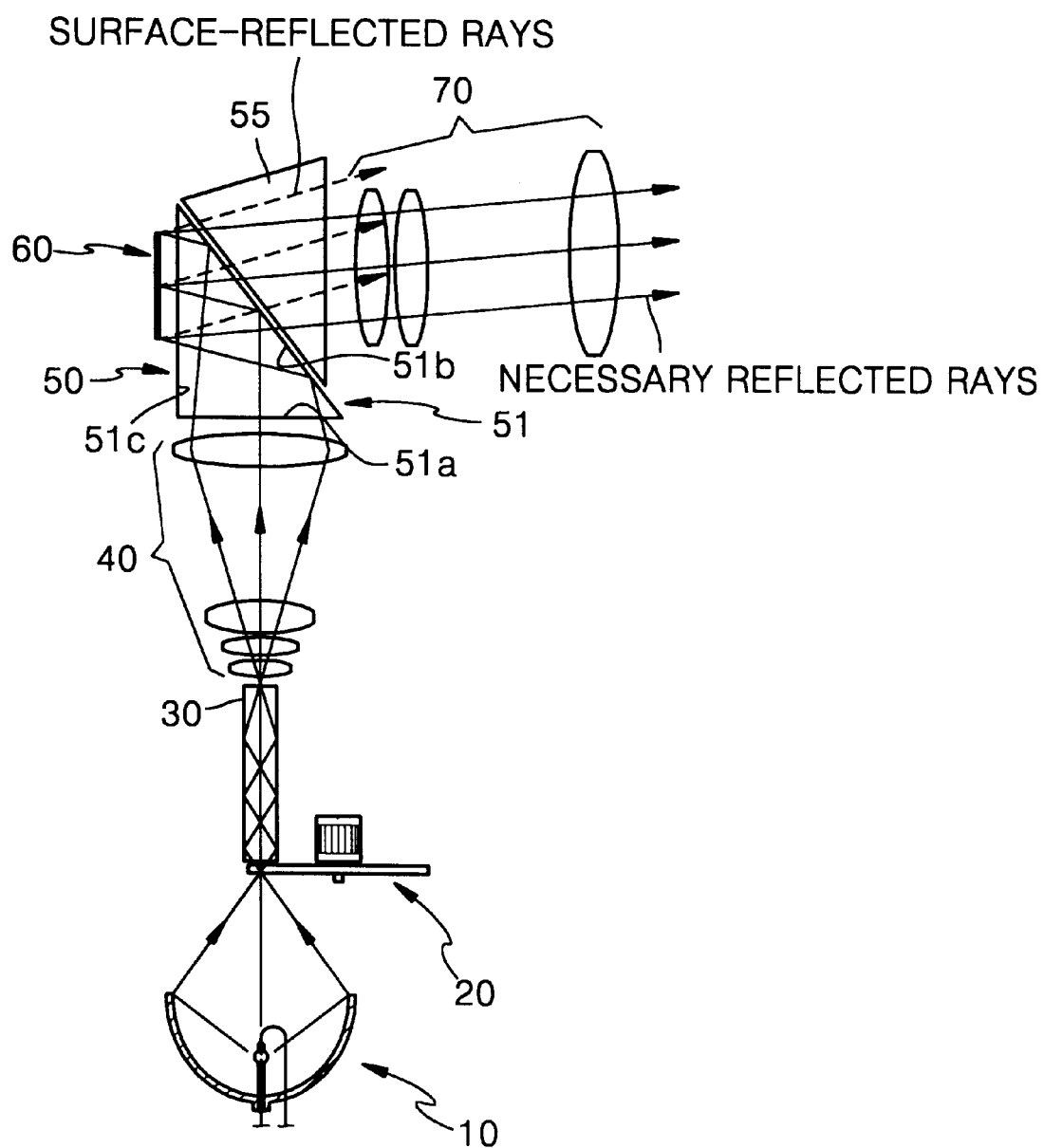
FIG. 1 is a schematic diagram illustrating an optical layout of a reflection-type projector employing a conventional micro-mirror device.
Figure 2:
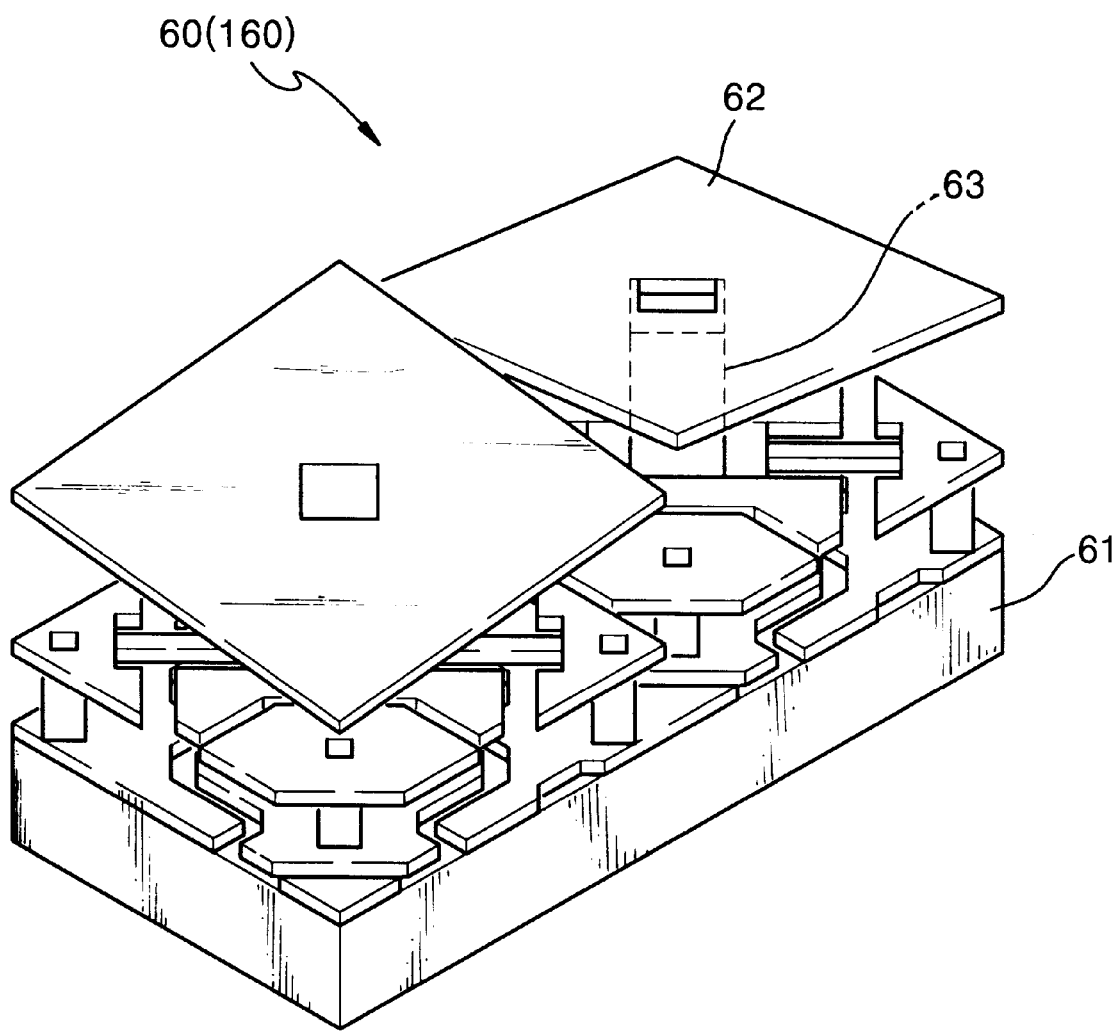
FIG. 2 is a perspective view schematically illustrating a portion of a general micromirror device.

Here, the micro-mirror device includes, as described with reference to FIGS. 2 and 3, movable mirrors 62 (see FIG. 3), posts 63 (see FIG. 3) supporting the respective movable mirrors 62 so that the movable mirrors 62 can pivot, and a window 65 (see FIG. 3) protecting the movable mirrors 62. Because the configurations thereof are substantially the same as or similar to the previously described configurations, detailed descriptions thereof are not repeated here.

Rays entering through the first critical surface 153a and reflected from the micro-mirror device 160 comprise necessary reflected rays and surface-reflected rays. The term "necessary reflected rays" indicates rays reflected from the movable mirrors 62 in on-states, and the term "surface-reflected rays" indicates rays reflected from the window 65 of the micro-mirror device 160. Here, the incident angles of the necessary reflected rays and the surface-reflected rays entering the first critical surface 153a are greater than the critical angle, and the incident angle of the necessary reflected rays differs from that of the surface-reflected rays. On the other hand, rays reflected from the movable mirrors 62 in off-states are indicated as "unnecessary rays," and directly enter the second critical surface 153c after passing through the entrance-exit surface 153b.

The entrance-exit surface 153b faces the micro-mirror device 160 and one surface of the projection lens unit 170, so that rays entering from the first critical surface 153a pass through the entrance-exit surface 153b and are directed to the micro-mirror device 160, and rays from the micro-mirror device 160 pass through the entrance-exit surface 153b and are directed to the first critical surface 153a or the second critical surface 153c.

The second critical surface 153c is slanted with respect to the optical axis of necessary reflected rays reflected from the first critical surface 153a. Unnecessary reflected rays reflected from the movable mirrors 62 and surface-reflected rays reflected from the first critical surface 153a pass through the second critical surface 153c, and necessary reflected rays reflected from the first critical surface 153a are reflected from the second critical surface 153c to the projection lens unit 170. Consequently, only necessary reflected rays selectively reflected from the micro-mirror device 160 are directed to the projection lens unit 170. (See FIG. 4.)

The projection lens unit 170 is disposed along the optical path between the beam separation prism 153 and the screen (not shown), and projects the necessary reflected rays entering from the beam separation prism 153 onto the screen in a magnifying manner.

The reflection-type projector configured as described above according to the present invention, employs a beam separation device having first and second critical surfaces and allows only necessary reflected rays among the necessary reflected rays, unnecessary reflected rays, and surface reflected rays reflected from the micro-mirror device to pass through the projection lens unit and to be projected onto the screen. Accordingly, the reflection-type projector of the present invention is advantageous, in that high contrast in a projected image can be attained.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A reflection-type projector comprising:

a light source that generates and emits light;

an optical path changer that changes a traveling path of an incident beam;

an image former that has an on-state and an off-state and that reflects a first portion of a plurality of incident rays, emitted from said light source and transmitted through said optical path changer, to form a plurality of necessary reflected rays when said image former is in the on-state and a plurality of unnecessary reflected rays when said image former is in the off-state, wherein the necessary and unnecessary reflected rays have first and second reflection paths, respectively, that differ from each other, said image former comprising a window forming a protective layer, wherein said window reflects a second portion of the plurality of incident rays to form a plurality of surface-reflected rays; and a projection lens unit that magnifies and projects the necessary reflected rays, wherein said optical path changer comprises a beam separation prism comprising:

a first critical surface that is slanted so that the plurality of incident rays emitted from said light source pass through said first critical surface, and the necessary reflected rays and the surface-reflected rays are reflected by said first critical surface;

an entrance-exit surface that faces said image former and one surface of said projection lens unit, wherein the necessary reflected rays, the unnecessary reflected rays, and the surface-reflected rays enter and the necessary rays exit through said entrance-exit surface; and a second critical surface that is slanted with respect to an optical axis of the necessary reflected rays reflected from said first critical surface, wherein said second critical surface transmits the unnecessary reflected rays and the surface-reflected rays reflected from said first critical surface, and wherein said second critical surface reflects the necessary reflected rays reflected from said first critical surface to said projection lens unit.

2. The reflection-type projector as claimed in claim 1, wherein said image former comprises a micro-mirror device comprising:

a plurality of movable mirrors corresponding to respective pixels, each movable mirror having an on-state and an off-state and reflecting the incident rays to form the necessary reflected rays corresponding to the on-state of the movable mirror and the unnecessary reflected rays corresponding to the off-state of the movable mirror; and a plurality of windows, each window enclosing one of said plurality of movable mirrors and transmitting most of the incident rays.

3. The reflection-type projector as claimed in claim 2, wherein the optical path changer further comprises a compensating prism having a compensating surface facing said first critical surface and compensating for deviations of the plurality of incident rays emitted from said light source.

4. The reflection-type projector as claimed in claim 2, further comprising:

a color selector provided on an optical path between said light source and said optical path changer, said color selector comprising:

a color wheel having a plurality of filters selectively transmitting a plurality of rays of red, blue, and green color wavelengths emitted from said light source, and a driving source for driving said color wheel so that said plurality of filters are positioned alternately on the optical path;

a collimating lens for converging the rays transmitted by said color selector to form a parallel beam; and a uniform light illuminator comprising a plurality of fly's eye lens units that divide the parallel beam from said collimating lens into a plurality of divided beams and converge and mix the plurality of divided beams to form a uniform beam.

5. The reflection-type projector as claimed in claim 1, further comprising:

a color selector provided on an optical path between said light source and said optical path changer, said color selector comprising:

a color wheel having a plurality of filters selectively transmitting rays of red, blue, and green color wavelengths emitted from said light source, and a driving source for driving said color wheel so that said plurality of filters are positioned alternately on the optical path;

a collimating lens for converging the rays transmitted by said color selector to form a parallel beam; and a uniform light illuminator comprising a plurality of fly's eye lens units that divide the parallel beam from said collimating lens into a plurality of divided beams and converge and mix the plurality of divided beams to form a uniform beam.

* * * * *